(12) United States Patent
Glahn et al.

(10) Patent No.: US 8,109,716 B2
(45) Date of Patent: Feb. 7, 2012

(54) GAS TURBINE ENGINE SYSTEMS INVOLVING HYDROSTATIC FACE SEALS WITH ANTI-FOULING PROVISIONING

(75) Inventors: Jorn A. Glahn, Manchester, CT (US); Peter M. Munsell, Granby, CT (US)

(73) Assignee: United Technologies Corp., Hartford, CT (US)

( * ) Notice: Subject to any disclaimer, the term of this patent is extended or adjusted under 35 U.S.C. 154(b) by 1082 days.

(21) Appl. No.: 11/840,645

(22) Filed: Aug. 17, 2007

(65) Prior Publication Data

US 2009/0047124 A1 Feb. 19, 2009

(51) Int. Cl.
*F01D 11/02* (2006.01)
*F16J 15/34* (2006.01)

(52) U.S. Cl. ............... 415/168.2; 415/171.1; 415/174.2

(58) Field of Classification Search ............... 415/168.2, 415/168.4, 171.1, 173.7, 174.2, 174.3, 174.4, 415/174.5

See application file for complete search history.

(56) References Cited

U.S. PATENT DOCUMENTS

| | | | |
|---|---|---|---|
| 2,545,916 A | | 3/1951 | Clark |
| 3,315,882 A | * | 4/1967 | Reed ............... 494/15 |
| 3,347,553 A | * | 10/1967 | Schweiger ............ 277/388 |
| 4,103,899 A | | 8/1978 | Turner |
| 4,406,460 A | * | 9/1983 | Slayton ............ 277/401 |
| 4,477,088 A | | 10/1984 | Picard |
| 4,687,346 A | | 8/1987 | Suciu |
| 4,916,892 A | * | 4/1990 | Pope ............... 60/772 |
| 4,928,978 A | * | 5/1990 | Shaffer et al. ............ 277/401 |
| 5,137,284 A | | 8/1992 | Holder |
| 5,174,584 A | | 12/1992 | Lahrman |
| 5,180,173 A | | 1/1993 | Kimura |
| 5,284,347 A | | 2/1994 | Pope |
| 6,145,840 A | | 11/2000 | Pope |
| 6,341,782 B1 | | 1/2002 | Etsion |
| 6,676,369 B2 | | 1/2004 | Brauer |
| 6,758,477 B2 | | 7/2004 | Brauer et al. |
| 7,175,388 B2 | | 2/2007 | Labbe et al. |
| 2004/0207158 A1 | | 10/2004 | Agrawal et al. |

(Continued)

FOREIGN PATENT DOCUMENTS

DE 524515 C 5/1931

(Continued)

OTHER PUBLICATIONS

The extended European Search Report of counterpart foreign application No. EP 08252724 filed Aug. 14, 2008.

(Continued)

*Primary Examiner* — Nathaniel Wiehe
(74) *Attorney, Agent, or Firm* — Kinney & Lange, P.A.

(57) ABSTRACT

Gas turbine engine systems involving hydrostatic face seals with anti-fouling provisioning are provided. In this regard, a representative turbine assembly for a gas turbine engine comprises: a turbine having a hydrostatic seal; the hydrostatic seal having a seal face, a seal runner, a carrier, and a biasing member; the seal face and the seal runner defining a high-pressure side and a lower-pressure side of the seal; the carrier being operative to position the seal face relative to the seal runner; and the biasing member being located on the lower-pressure side of the seal and being operative to bias the carrier such that interaction of the biasing member and gas pressure across the seal causes the carrier to position the seal face relative to the seal runner.

20 Claims, 3 Drawing Sheets

U.S. PATENT DOCUMENTS

| | | |
|---|---|---|
| 2007/0007730 A1 | 1/2007 | Garrison et al. |
| 2007/0085278 A1 | 4/2007 | Davis et al. |
| 2007/0149031 A1 | 6/2007 | Martin et al. |
| 2008/0018054 A1 | 1/2008 | Herron et al. |

FOREIGN PATENT DOCUMENTS

| | | |
|---|---|---|
| DE | 102007027364 A1 | 12/2007 |
| EP | 0523899 A1 | 1/1993 |
| EP | 1348898 A1 | 10/2003 |
| EP | 1380778 A1 | 1/2004 |
| EP | 1780450 A1 | 5/2007 |
| EP | 1798455 A1 | 6/2007 |
| EP | 1852573 A2 | 11/2007 |
| FR | 1366961 A | 7/1964 |
| GB | 920782 A | 3/1963 |
| GB | 1174207 A | 12/1969 |

OTHER PUBLICATIONS

The extended European Search Report of counterpart foreign application No. EP 08252690 filed Aug. 14, 2008.

* cited by examiner

GAS TURBINE ENGINE SYSTEMS INVOLVING HYDROSTATIC FACE SEALS WITH ANTI-FOULING PROVISIONING

BACKGROUND

1. Technical Field

The disclosure generally relates to gas turbine engines.

2. Description of the Related Art

A gas turbine engine typically maintains pressure differentials between various components during operation. These pressure differentials are commonly maintained by various configurations of seals. In this regard, labyrinth seals oftentimes are used in gas turbine engines. As is known, labyrinth seals tend to deteriorate over time. By way of example, a labyrinth seal can deteriorate due to rub interactions from thermal and mechanical growths, assembly tolerances, engine loads and maneuver deflections. Unfortunately, such deterioration can cause increased flow consumption resulting in increased parasitic losses and thermodynamic cycle loss.

SUMMARY

Gas turbine engine systems involving hydrostatic face seals with anti-fouling provisioning are provided. In this regard, an exemplary embodiment of a hydrostatic seal for a gas turbine engine comprises: a face seal having a seal face; a seal runner; and means for reducing a potential for debris to foul the hydrostatic seal formed by the seal face and the seal runner.

An exemplary embodiment of a turbine assembly for a gas turbine engine comprises: a turbine having a hydrostatic seal; the hydrostatic seal having a seal face, a seal runner, a carrier, and a biasing member; the seal face and the seal runner defining a high-pressure side and a lower-pressure side of the seal; the carrier being operative to position the seal face relative to the seal runner; and the biasing member being located on the lower-pressure side of the seal and being operative to bias the carrier such that interaction of the biasing member and gas pressure across the seal causes the carrier to position the seal face relative to the seal runner.

An exemplary embodiment of a gas turbine engine comprises: a compressor; a shaft interconnected with the compressor; and a turbine operative to drive the shaft, the turbine having a hydrostatic seal; the hydrostatic seal having a seal face, a seal runner and a biasing member; the seal face and the seal runner defining a high-pressure side and a lower-pressure side of the seal; the biasing member being located on the lower-pressure side of the seal and being operative to bias positioning of the seal face relative to the seal runner.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems involving hydrostatic face seals with anti-fouling provisioning are provided, several exemplary embodiments of which will be described in detail. In this regard, hydrostatic face seals can be used at various locations of a gas turbine engine, such as in association with a low-pressure turbine. Notably, a hydrostatic seal is a seal that uses balanced opening and closing forces to maintain a desired separation between a seal face and a corresponding seal runner. Use of a hydrostatic face seal requires maintaining a metered airflow through orifices of the seal in order to produce desired seal characteristics. Such a metered airflow can be altered (e.g., interrupted) by the introduction of debris, which may be present in the gas turbine engine for a variety of reasons.

In order to reduce the possibility of a seal being fouled by debris, some embodiments incorporate the use of one or more anti-fouling provisions. By way of example, such provisions can include locating one or more potential debris-producing components of the seal to the lower-pressure side of the seal. Additionally or alternatively, an air bearing supply channel of the seal that limits the potential for debris to become stuck in the channel can be used. For instance, in some embodiments, the channel does not incorporate bends. Additionally or alternatively, an air bearing supply channel can be shielded to prevent debris from entering the channel.

Figure 1:
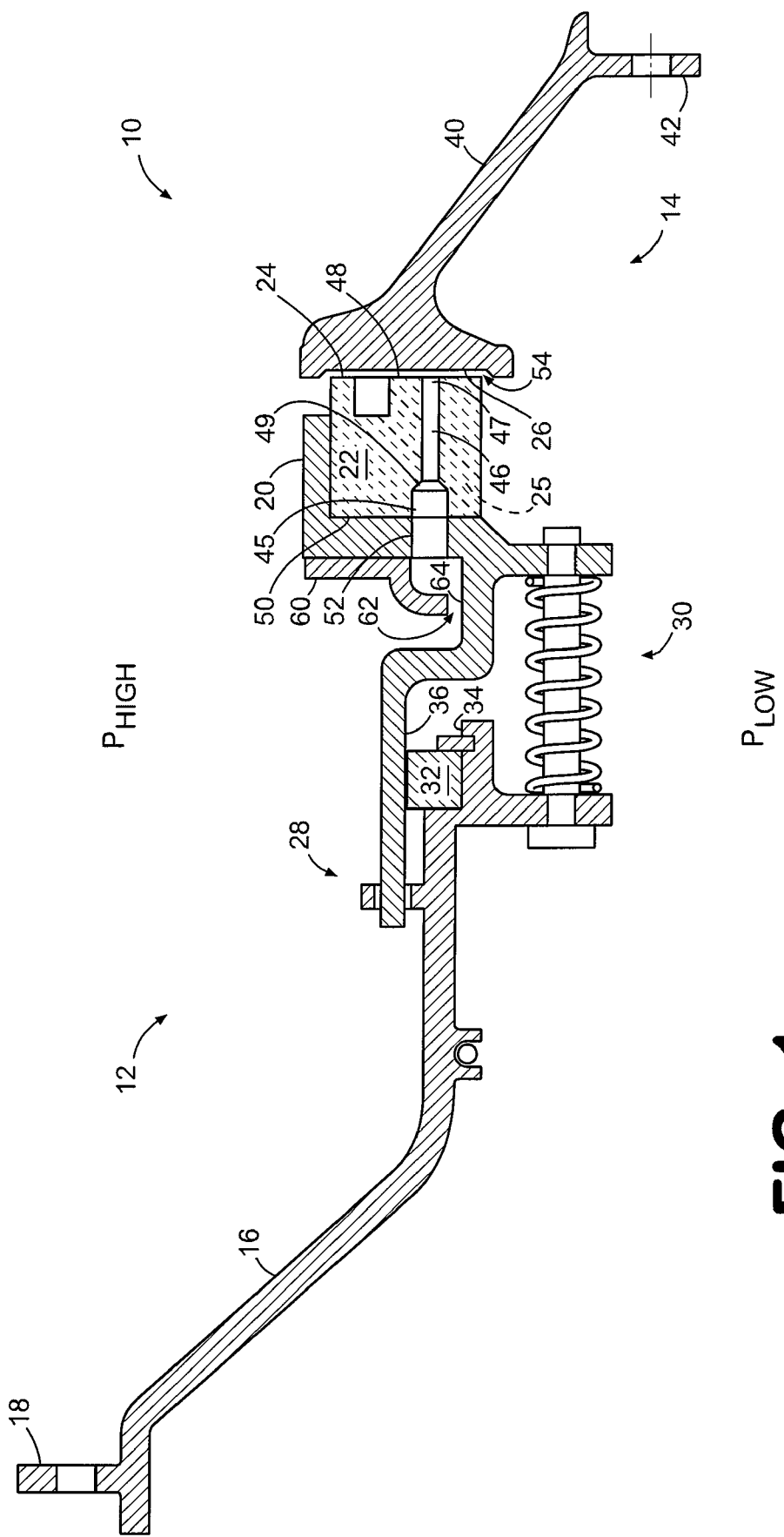
FIG. 1 is a schematic diagram depicting an exemplary embodiment of a hydrostatic face seal with anti-fouling provisioning.

An exemplary embodiment of a hydrostatic face seal with anti-fouling provisioning is depicted schematically in FIG. 1. As shown in FIG. 1, hydrostatic face seal 10 is provided by a stationary stator assembly 12 and a rotating rotor assembly 14. The stator assembly includes an arm 16 that extends from a mounting bracket 18, which facilitates attachment, removal and/or position adjustment of the stator assembly in the engine. Notably, other embodiments may not incorporate such a mounting bracket.

Stator assembly 12 also incorporates a carrier 20 that carries a face seal 22. Face seal 22 is annular in shape and includes a seal face 24, which is one of the seal-forming surfaces of the hydrostatic seal. A vent 25 also is provided through face seal 22.

Carrier 20 is axially translatable so that seal face 24 can move, with the carrier, away from or toward (e.g., into contact with) a seal runner 26 (which is the other of the seal-forming components of the hydrostatic seal) of rotor assembly 14. In this embodiment, an anti-rotation lock 28 is provided to prevent circumferential movement and assist in aligning the seal carrier to facilitate axial translation of the carrier.

A biasing member 30, which is provided as a spring in this embodiment, biases the seal face against the seal runner until overcome by gas pressure. Multiple springs may be disposed about the circumference of the seal. In this regard, the biasing force of the biasing member can be selected to maintain a desired pressure differential between a high-pressure cavity ($P_{HIGH}$) and a lower-pressure cavity ($P_{LOW}$) of the seal. Notably, a piston ring 32 is captured between opposing surfaces 34, 36 of the stator assembly and carrier, respectively, to control gas leakage between the arm of the stator assembly and the carrier.

With respect to the rotor assembly 14, rotor assembly 14 supports the seal runner 26, which is annular in shape. Specifically, the rotor assembly 14 includes an arm 40 that extends from a mounting bracket 42, which facilitates attachment, removal and/or position adjustment of the rotor assembly 14. Notably, other embodiments may not incorporate such a mounting bracket.

With respect to anti-fouling provisions, the embodiment of FIG. 1 incorporates several such means. For instance, seal 10 locates the biasing member 30 in the lower-pressure cavity side ($P_{LOW}$) of the seal. Notably, the biasing member has the potential to produce debris. By locating the biasing member on the lower-pressure cavity side of the seal, any debris produced by the biasing member will have a tendency to move away from the seal face and the seal runner and, therefore, should not foul the seal. This is in contrast to a seal that locates the biasing member on the high-pressure side. In such an embodiment, debris from the biasing member can be drawn (due to the pressure differential and corresponding gas flow across the seal) between the seal face and seal runner, thus fouling the seal.

As another example, seal 10 incorporates an air bearing supply channel 46 that limits the potential for debris to become stuck in the channel. Specifically, air bearing supply channel 46 is formed through face seal 22 from a side 48 (which includes seal face 24) to an opposing side 50 (which is attached to carrier 20). Notably, carrier 20 includes an orifice 52 that is aligned with the air bearing supply channel. So configured, air can be provided from the high-pressure side of the seal, through orifice 52, then through air bearing supply channel 46 to seal location 54, which is located between side 48 and seal runner 26.

In order to reduce the potential for debris to become stuck in the air bearing supply channel, channel 46 of the embodiment of FIG. 1 does not incorporate bends. That is, the channel is a substantially straight through-hole. While a constant diameter straight through-hole is less susceptible to debris accumulation when compared with internal passages that have sharp bends, it is preferable to tailor the diameter along the tube towards a desired pressure distribution. Thus, in the embodiment of FIG. 1, channel 46 includes a cylindrical portion 45 that is interconnected with a cylindrical portion 47 (of smaller diameter) via a conical portion 49 such that the channel exhibits a non-uniform diameter along its length. It should be noted that the cylindrical portion 47 could be connected to orifice 52 without incorporation of a cylindrical portion 45. In this case, the non-uniform diameter of the channel inside face seal 22 consists of a lead-in conical portion 49 and the cylindrical section 47. Connecting cylindrical portions 45 and 47 with a conical portion 49 accelerates the flow and reduces residence times of any debris particles. Therefore, the potential for debris accumulation is reduced.

Alternatives to straight through-hole configurations that may reduce a tendency for debris to get stuck in the internal face seal channels could involve internal cavities that serve reservoirs. These could be formed by relatively large diameter holes drilled radially inward and deeper than that needed to feed an axial air bearing supply hole, which is typically similar to cylindrical portion 47.

Seal 10 also incorporates a shield for reducing the potential of debris to enter the air bearing supply channel. Specifically, a shield 60 is provided that extends outwardly from carrier 20 in a vicinity of orifice 52. The shield forms a physical barrier that discourages debris travelling on a radially inward trajectory from entering the orifice. Additionally, for debris to enter orifice 52 of the embodiment of FIG. 1, the debris is required to pass through a narrow opening 62 defined by the shield and a surface 64 of the carrier. Notably, since the orifice is located radially outboard of surface 64, the tortuous path formed by the shield and the orifice location may prevent debris from entering the air bearing supply channel.

Figure 2:
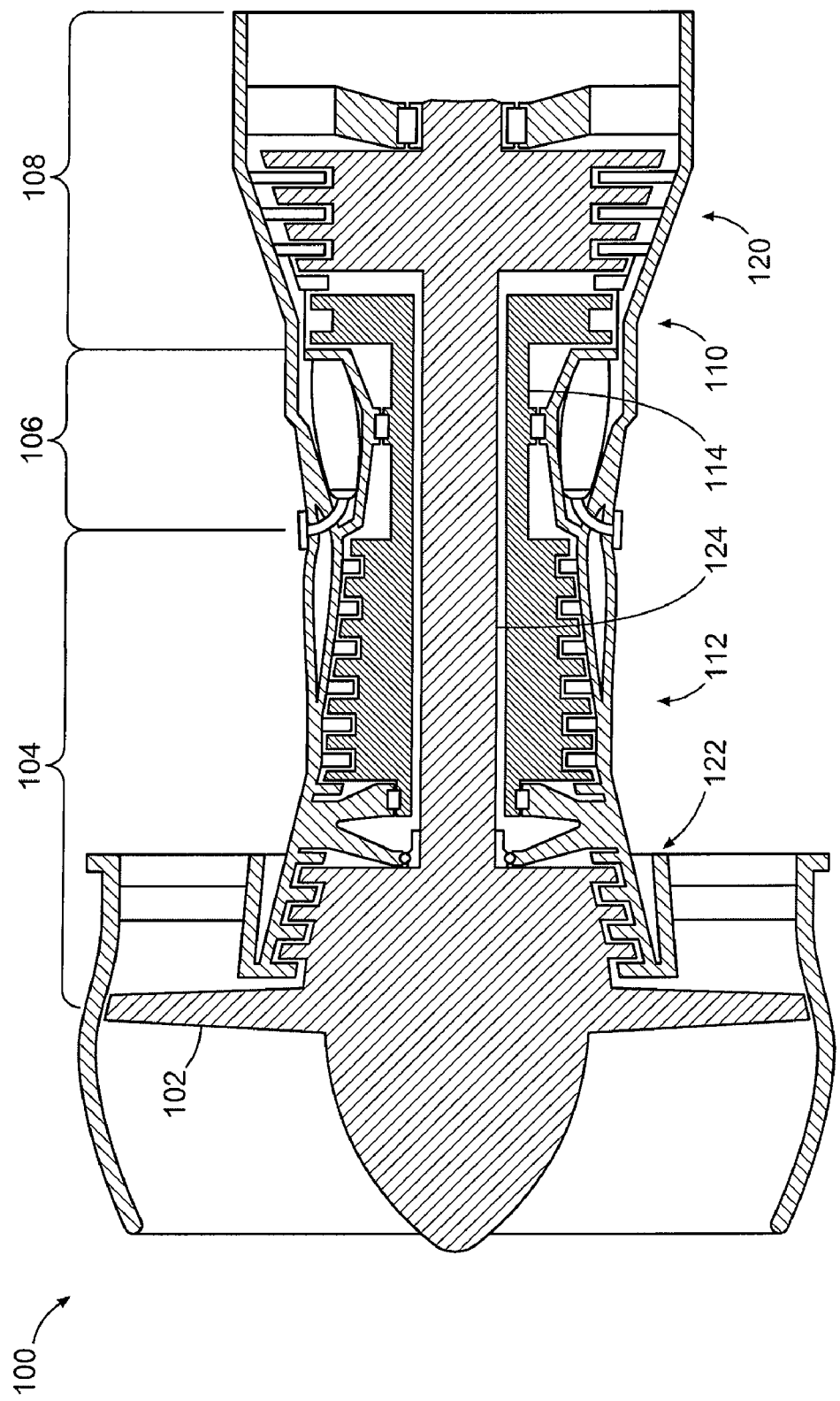
FIG. 2 is a schematic diagram depicting an exemplary embodiment of a gas turbine engine.

FIG. 2 is a schematic diagram depicting an exemplary embodiment of a gas turbine engine, in which an embodiment of a hydrostatic face seal with anti-fouling provisioning can be used. As shown in FIG. 2, engine 100 is configured as a turbofan that incorporates a fan 102, a compressor section 104, a combustion section 106 and a turbine section 108. Although the embodiment of FIG. 2 is configured as a turbofan, there is no intention to limit the concepts described herein to use with turbofans, as various other configurations of gas turbine engines can be used.

Engine 100 is a dual spool engine that includes a high-pressure turbine 110 interconnected with a high-pressure compressor 112 via a shaft 114, and a low-pressure turbine 120 interconnected with a low-pressure compressor 122 via a shaft 124. It should also be noted that although various embodiments are described as incorporating hydrostatic face seals with anti-fouling provisioning in low-pressure turbines, such seals are not limited to use with low-pressure turbines.

Figure 3:
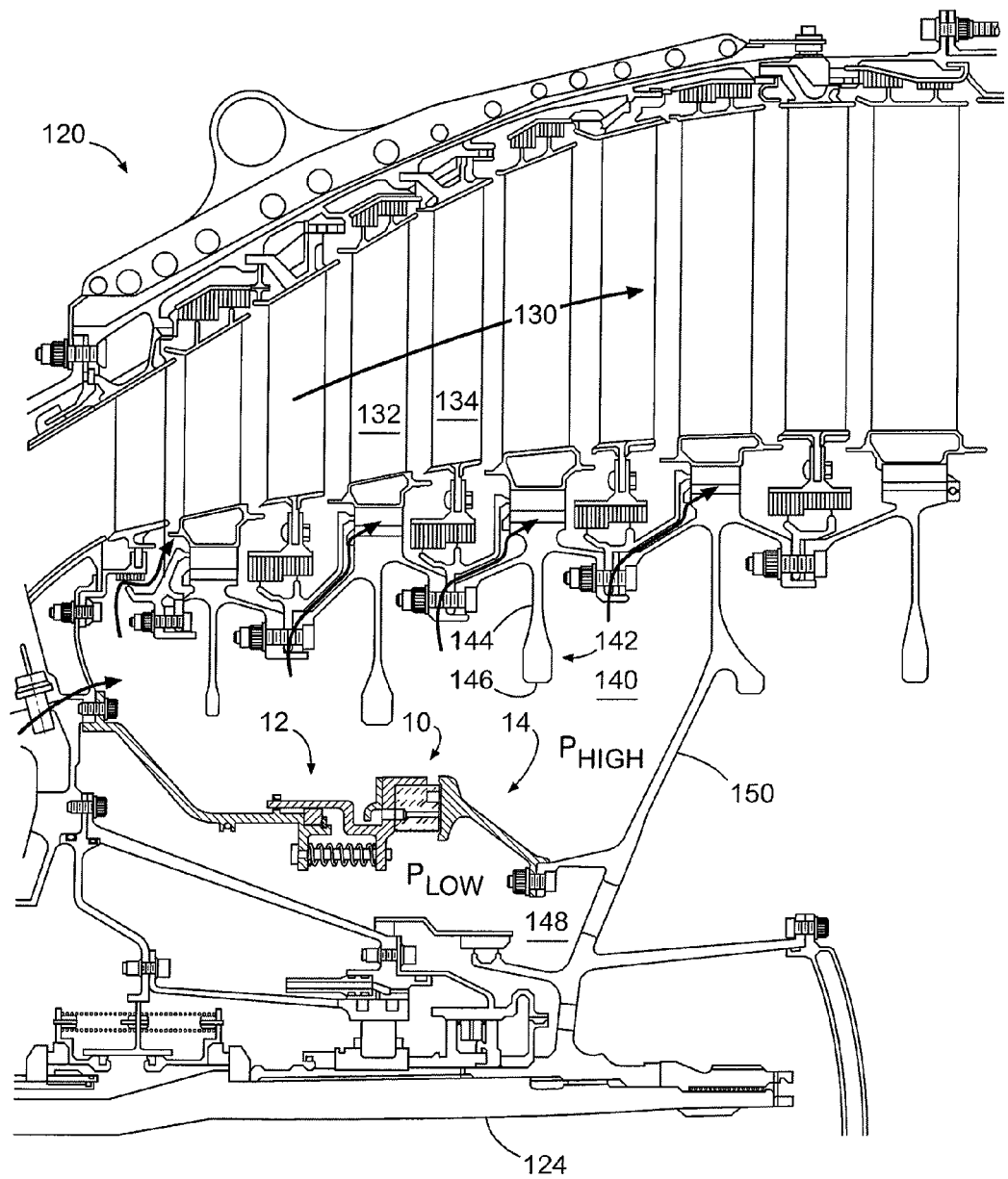
FIG. 3 is a schematic diagram depicting a portion of the low-pressure turbine of FIG. 2, showing detail of the embodiment of the hydrostatic face seal with anti-fouling provisioning of FIG. 1 installed therein.

As shown in FIG. 3, low-pressure turbine 120 defines a primary gas flow path 130 along which multiple rotating blades (e.g., blade 132) and stationary vanes (e.g., vane 134) are located. In this embodiment, the blades are mounted to turbine disks, the respective webs and bores of which extend into a high-pressure cavity 140. For instance, disk 142 includes a web 144 and a bore 146, each of which extends into cavity 140.

A relatively lower-pressure cavity 148 is oriented between high-pressure cavity 140 and turbine hub 150, with a seal 10 (described in detail before with respect to FIG. 1) being provided to maintain a pressure differential between the high-pressure cavity and the lower-pressure cavity. Recall that seal assembly 10 incorporates a stator assembly 12 and a rotor assembly 14. Notably, the stator assembly is mounted to a non-rotating structure of the turbine, whereas the rotor assembly is mounted to a rotating structure. In the implementation of FIG. 3, the rotor assembly is mounted to turbine hub 150.

It should be noted that seal 10 is provided as a removable assembly, the location of which can be adjusted. As such, thrust balance trimming of engine 100 can be at least partially accommodated by altering the position of the seal assembly.

In operation, the seal face intermittently contacts the seal runner. By way of example, contact between the seal face and the seal runner can occur during sub-idle conditions and/or during transient conditions. That is, contact between the seal face and the seal runner is maintained until gas pressure in the high-pressure cavity is adequate to overcome the biasing force, thereby separating the seal face from the seal runner. During normal operating conditions, however, the seal face and the seal runner should not contact each other.

Since the embodiments described herein are configured as lift-off seals (i.e., at least intermittent contact is expected), materials forming the surfaces that will contact each other are selected, at least in part, for their durability. In this regard, a material comprising carbon can be used as a seal face material. It should be noted, however, that carbon can fracture or otherwise damaged due to unwanted contact (e.g., excessively forceful contact) between the seal face and the seal runner as may be caused by pressure fluctuations and/or vibrations, for example. It should also be noted that carbon may be susceptible to deterioration at higher temperatures.

Therefore, carbon should be used in locations where predicted temperatures are not excessive. By way of example, use of such a material may not be appropriate, in some embodiments, in a high-pressure turbine.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, although the embodiments described herein are configured as lift-off seals, other types of seals can be used. All such modifications and variations are intended to be included herein within the scope of this disclosure and protected by the accompanying claims.

The invention claimed is:

1. A hydrostatic seal for a gas turbine engine comprising:
a face seal having a seal face;
a seal runner, wherein the seal face and the seal runner define a high-pressure side and a lower-pressure side of the hydrostatic seal;
a carrier, the face seal being mounted to the carrier such that the carrier positions the seal face with respect to the seal runner, wherein the face seal has an air bearing supply channel extending from the high-pressure side to a side on which the seal face is located, and wherein the carrier has an orifice aligned with the air bearing supply channel; and
a shield attached to the carrier adjacent the orifice, the carrier operative to form a physical barrier that discourages debris travelling on a radially inward trajectory from entering the air bearing supply channel and thereby reduces a potential for debris to foul the hydrostatic seal formed by the seal face and the seal runner.

2. The seal of claim 1, wherein:
the seal further comprises a biasing member operative to bias the seal face toward the seal runner; and
the biasing member being located on the lower-pressure side of the seal.

3. The seal of claim 2, wherein the biasing member comprises a spring.

4. The seal of claim 1, wherein:
the seal comprises a stator assembly; and
the seal face is mounted to the stator assembly.

5. The seal of claim 1, wherein:
the seal comprises a rotor assembly; and
the seal runner is mounted to the rotor assembly.

6. The seal of claim 1, wherein the air bearing supply channel exhibits a straight configuration.

7. The seal of claim 6, wherein the air bearing supply channel exhibits a non-uniform diameter along a length thereof.

8. A turbine assembly for a gas turbine engine comprising:
a turbine having a hydrostatic seal;
the hydrostatic seal having a seal face, a seal runner, a carrier, and a biasing member;
the seal face and the seal runner defining a high-pressure side and a lower-pressure side of the seal, wherein the seal face is a surface of a face seal, the face seal having an air bearing supply channel extending from the high-pressure side to a side on which the seal face is located;
the carrier being operative to position the seal face relative to the seal runner;
a shield extending outwardly from the carrier on the high-pressure side of the seal, the shield being operative to discourage debris from entering the air bearing supply channel; and
the biasing member being located on the lower-pressure side of the hydrostatic seal and being operative to bias the carrier such that interaction of the biasing member and gas pressure across the hydrostatic seal causes the carrier to position the seal face relative to the seal runner.

9. The assembly of claim 8, wherein the air bearing supply channel exhibits a straight configuration.

10. The assembly of claim 8, wherein the turbine is a low-pressure turbine.

11. The assembly of claim 8, wherein the hydrostatic seal is provided by a stator assembly and a rotor assembly, at least one of which is removably mountable within the turbine.

12. The assembly of claim 8, wherein the hydrostatic seal is a lift-off seal, with the seal face being biased to a contact position in which the seal face contacts the seal runner.

13. The assembly of claim 8, wherein the air bearing supply channel exhibits a non-uniform diameter along a length thereof.

14. The assembly of claim 8, wherein the carrier has an orifice aligned with the air bearing supply channel.

15. A gas turbine engine comprising:
a compressor;
a shaft interconnected with the compressor; and
a turbine operative to drive the shaft, the turbine having a hydrostatic seal;
the hydrostatic seal having a seal face, a seal runner, a carrier and a biasing member;
the seal face and the seal runner defining a high-pressure side and a lower-pressure side of the seal, wherein the seal face is a surface of a face seal, the face seal having an air bearing supply channel extending from the high-pressure side to a side on which the seal face is located;
the carrier being operative to position the seal face relative to the seal runner;
a shield extending outwardly from the carrier on the high-pressure side of the seal, the shield being operative to discourage debris from entering the air bearing supply channel; and
the biasing member being located on the lower-pressure side of the hydrostatic seal and being operative to bias the carrier such that interaction of the biasing member and gas pressure across the hydrostatic seal causes the carrier to position the seal face relative to the seal runner.

16. The engine of claim 15, wherein at least a portion of the seal face configured to contact the seal runner is formed of a material comprising carbon.

17. The engine of claim 15, wherein the engine is a turbofan.

18. The engine of claim 15, wherein the turbine is a low-pressure turbine.

19. The engine of claim 15, wherein the air bearing supply channel exhibits a straight configuration.

20. The engine of claim 15, wherein the air bearing supply channel exhibits a non-uniform diameter along a length thereof.

* * * * *